United States Patent
Puryear

[11] Patent Number: 5,467,932
[45] Date of Patent: Nov. 21, 1995

[54] LINE GUIDE FOR FISHING REELS

[76] Inventor: John W. Puryear, 119 E. Beach Blvd., Biloxi, Miss. 39530

[21] Appl. No.: 40,104

[22] Filed: Mar. 30, 1993

[51] Int. Cl.[6] ............................... A01K 89/01
[52] U.S. Cl. ..................... 242/236; 242/228; 242/321
[58] Field of Search .................. 242/228, 234, 242/235, 236, 238, 239, 240, 231, 232, 321, 157; 43/24

[56] References Cited

U.S. PATENT DOCUMENTS

| | | | |
|---|---|---|---|
| 2,147,063 | 2/1939 | Sanford, Jr. | 240/157 |
| 2,197,245 | 4/1940 | Sanford, Jr. | 242/157 |
| 2,306,112 | 12/1942 | Touchstone | 43/24 |
| 2,590,369 | 3/1952 | Beeler | 242/228 |
| 2,630,978 | 3/1953 | Skarbek | 242/228 X |
| 2,723,808 | 11/1955 | Elliott et el. | 242/228 X |
| 2,732,147 | 1/1956 | Rotter | 242/228 |
| 2,767,935 | 10/1956 | Fowler | 242/235 |
| 2,931,592 | 4/1960 | Sloan | 242/228 X |
| 2,941,747 | 6/1960 | Schmidt | 242/228 X |
| 3,255,982 | 6/1966 | Emry | 242/228 |
| 3,327,962 | 6/1967 | Sarah | 242/236 |
| 3,534,919 | 10/1970 | Rowe | 242/236 X |
| 3,685,762 | 8/1972 | Winfree et al. | 242/228 |
| 4,610,402 | 9/1986 | Corbett et al. | 242/157 X |
| 4,637,569 | 1/1987 | Swisher | 242/239 |

FOREIGN PATENT DOCUMENTS 324855  9/1919  Germany ................. 242/157

Primary Examiner—Daniel P. Stodola
Assistant Examiner—Michael R. Mansen

[57] ABSTRACT

A spincast reel, having a line spool which is aligned along the axis of a fishing rod. A rotating cap on the front of the spool, having retractable fingers, serves to wind up the line on the spool during retrieval. The line passes from the spool through a moveable line control arm, which is connected to a digit actuated lever for movement from an aligned position ahead of the spool, continuously through to a position at right angles to the axis of the spool. The line passes through a line guide in the line control arm; the line guide is lined with a freely spinning surface, supported on ball bearings.

2 Claims, 3 Drawing Sheets

LINE GUIDE FOR FISHING REELS

BACKGROUND OF THE INVENTION

This invention relates to the field of Spin Cast reels for fishing rods. Such reels are best identified by their having a fishing line wound on a totally covered spool which is mounted with an axis parallel to the fishing rod to which the reel is attached. The fishing line is wound onto the spool by a winding spinner head, sometimes called a winding drum, within the cover. By contrast, Spinning reels have open line spools parallel to the rod, but have a rotating bail which winds the fishing line onto the reel spool during takeup. Casting reels have rotating line spools transverse to the pole.

During casting both spin cast and spinning. reels pay out the fishing line off the end of the reel or line spool, and then wind the line back onto the spool for takeup. This introduces twist to the line during retrieval. Monofilament lines are particularly susceptible to line twist, which significantly limits the distance a line can be cast, and increases the possibility of line tangling or fouling.

Spin cast reels with lifting bails are shown in U.S. Pat. No. 2,732,147 to Rotter; U.S. Pat. No. 2,590,369 to Beeler, which shows a spincast reel with the more typical closed hose section in conjunction with a lifting bail.

German 2619077 to Katt shows a reel where the line reel is moved transverse to the fishing rod during takeup of the line.

Russian SU 601630 shows a spinning reel in which the line guide or bail is oscillated to produce bait movement.

British 8157 to Day shows a casting reel transverse to the rod using a moving line guide to speed the payout of line during casting.

French 859236 to Morfaux et al discloses a line guide with an enlarged line opening.

French 881,835 shows a different form of line guide for a reel.

U.S. Pat. No. 2,630,978 to Skarbek and U.S. Pat. No. 2,723,808 to Elliott et al disclose spinning reels which are mounted transversely to the axis of the fishing rod.

The patents show that it is advantageous for easy casting to cast line from the end of the line spool. The disadvantage of such line payout is that retrieval of a line which has been pulled off the end of a spool induces a twist in the line which interferes with free travel of the line in flight and causes considerable tangling, especially in the last few yards of retrieved line.

SUMMARY OF THE INVENTION

Spincast reels to date have front covers to facilitate casting and line control. This invention discloses a spincast reel which combines the best features of spincast and spinning reels, providing for open spool line control in casting, minimizing damage to fishing line during casting, and further minimizing line twist during line retrieval.

The invention is a spincast reel, having a line spool which is aligned along the axis of a fishing rod. A rotating spinner head on the front of the spool, having retractable pins or fingers, serves to wind up the line on the spool during retrieval. The line passes from the spool through a moveable line control arm, which is connected to a thumb actuated lever for movement from an aligned position ahead of the spool, continuously through to a position at right angles to the axis of the spool. The line passes through a line guide in the line control arm; the line guide is lined with a freely spinning surface, supported on ball bearings.

The combination controls the movement of the line during casting by moving the line control arm to the right angle position which prevents any payout of the line. This line control arm movement, done by thumb pressure on a lever, holds the line fixed while the rod is whipped back and forth to produce a casting momentum. Release of the lever causes the line control arm to snap under spring pressure back in line with the spool axis; the line then pays out smoothly over the end cap of the spool, through the line guide, in a cast. The ball bearing insert in the line guide significantly reduces line twist as the line is retrieved, minimizing tangle.

During the hooking of fish and retrieval of the line, the spinner head is rotated by a geared hand crank to retrieve the line and wind it on the spool. The line rides on extendable spinner head pins, which carry the line around the spool. Drag may be provided by the spinner head, or by permitting the spool to rotate against drag brakes.

By contrast to prior art spincast reels, which hold the line immobile by moving the spinner head forward against a cover, pinching the line between a gasket on the spinner head and the cover, the line is not pinched or cut by the line holding mechanism. This significantly reduces damage to a monofilament line during casting in comparison with prior art closed cover spincast reels It is thus an object of the invention to combine the best features of spincast and spinning reels.

It is a further object of the invention to show a spincast reel which minimizes pinching or cutting of the fishing line during casting.

It is a further object of the invention to disclose a spincast reel which permits one finger or thumb control of the line during casting, snubbing the line prior to the cast.

It is a further object of the invention to disclose a spincast reel which permits one finger or thumb control of the line during casting, feathering the line during casting, with free spooling of the line during the cast.

It is a further object of the invention to disclose a spincast reel which minimizes twist in a fishing line during use.

It is a further object of the invention to disclose a spincast reel which minimizes line twist during line takeup.

It is a further object of the invention to disclose a spincast reel which has greater casting range than prior art reels.

It is a further object of the invention to disclose a spincast reel which is less likely to jam or tangle than prior art spincast reels.

It is a further object of the invention to disclose a spincast reel which has instant visual and physical access to the line at all times.

These and other objects of the invention can be seen from the detailed description of the invention which follows.

DETAILED DESCRIPTION OF THE INVENTION

Figure 1:
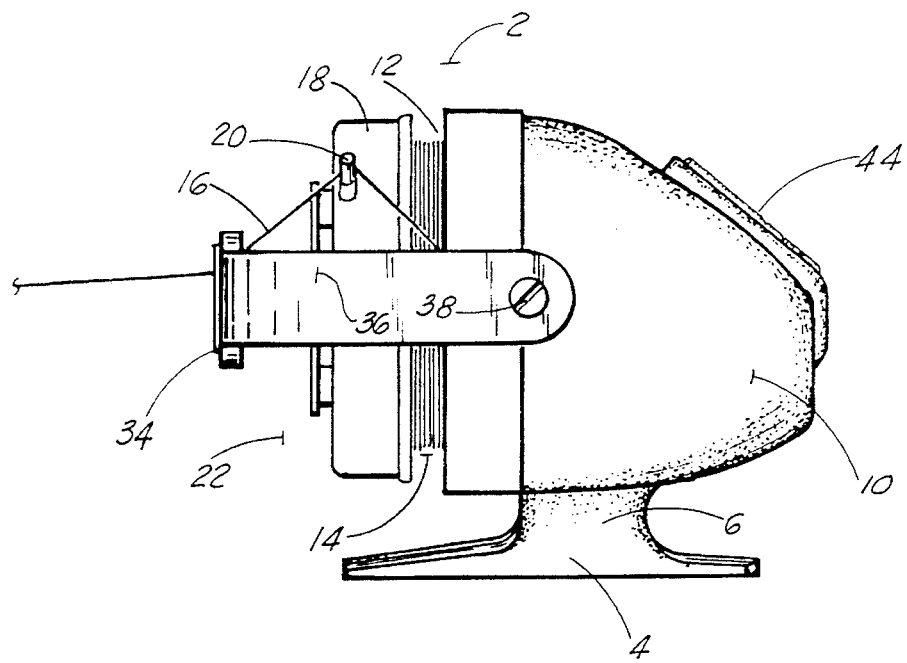
FIG. 1 is a side view of one embodiment of the invention.
Figure 2:
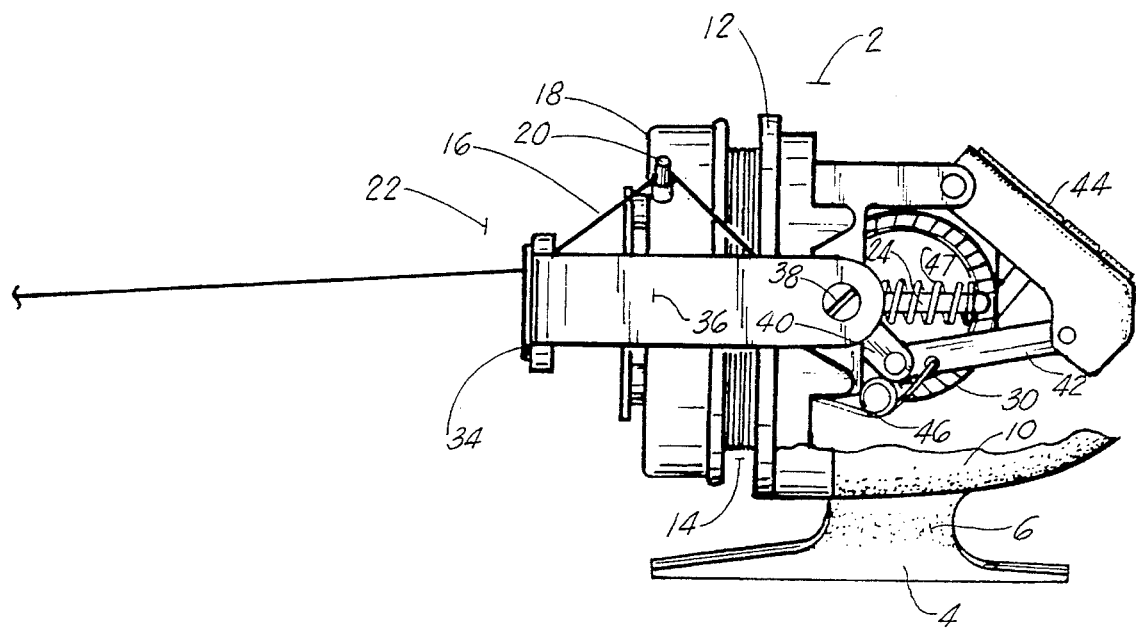
FIG. 2 is a cut away side view of the embodiment of FIG. 1.
Figure 3:
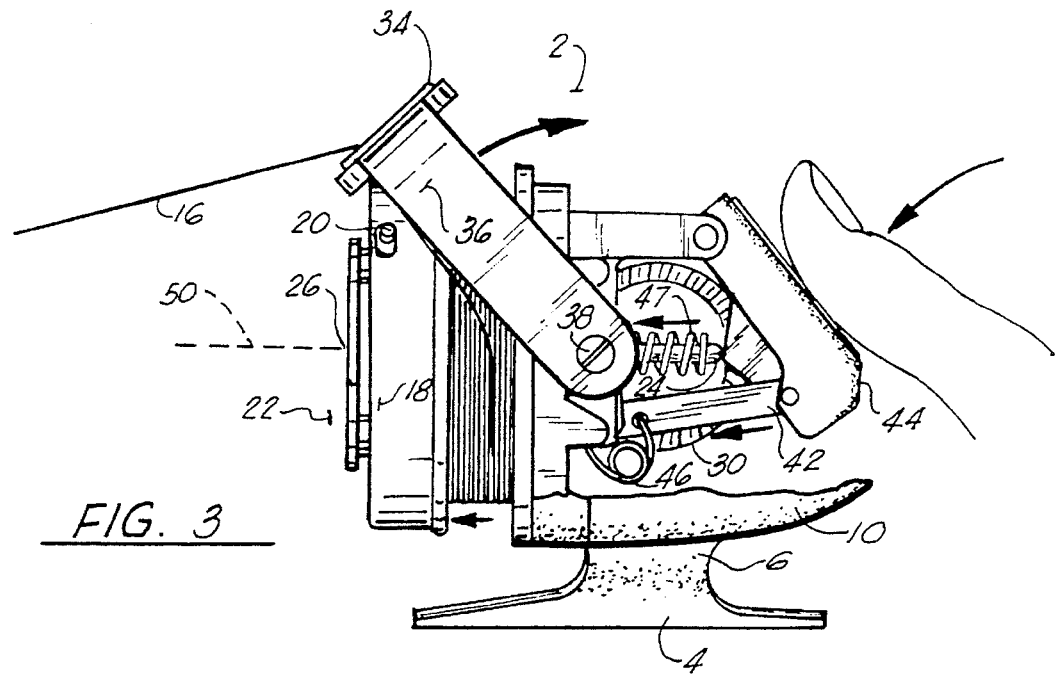
FIG. 3 is a cut away side view of the embodiment showing one thumb control of the line guide positioning.
Figure 4:
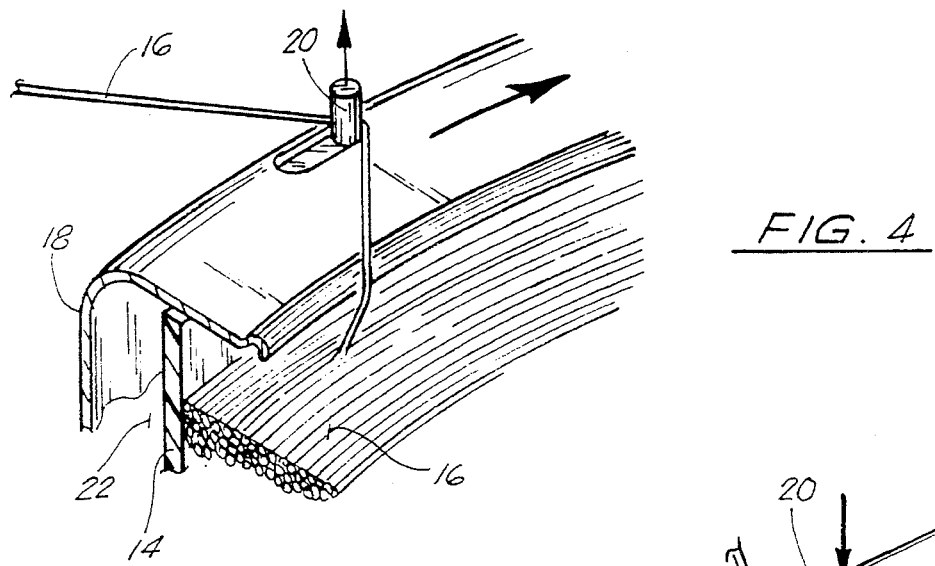
FIG. 4 is a detail view showing the retractable pins of the spinner head in the line take up position.
Figure 5:
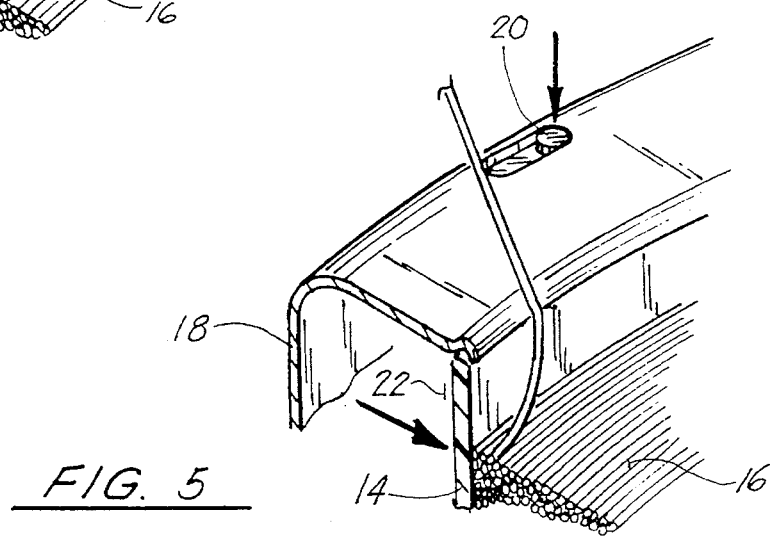
FIG. 5 is a detail view showing the retractable pins of the spinner head in the line casting position.

The exemplary embodiment of the invention is shown in FIGS. 1 and 2. The invention is a spincast reel 2, having a base 4 for mounting to a rod, and a support 6, arising from the base 4, supporting a back housing 10. This back housing 10 is an enclosed metal or plastic shell which is affixes to a circular front plate 12. Axially mounted in front of the front plate 12 is a line spool 14. A fishing line 16 is wound on the spool 14.

A spinner head 18, in the form of a reversed open metal cup with extensible pins 20 extending through the periphery, is mounted over the front end 22 of the line spool 14, and is removably affixed to an axle 24 passing through the center 26 of the spool 14. This axle 24 is mounted in the front plate 12, through a suitable bearing (not shown) for rotation. The axle 24 is spring loaded, for lateral motion along the axis of the reel, and is driven in rotation by a pinion gear (not shown), which is driven in turn by a drive gear 30, which the user turns by means of a reel handle 32. The construction of the gearing, axle 24 and spinner head 18 is well known in the art of spin cast reel design, and is not further described or shown here.

Alternate forms of reels 2 are equally suitable for the invention. It can be readily seen that a spinning reel or a spincast reel, having a rotating spool, can be substituted for the spincast reel as described above.

Mounted over the front end 22 of the spool 14 is a line guide 34, through which passes the line 16 from the spool 14. In the exemplar embodiment shown in the drawings, this guide 34 is mounted in the center of a pivoting line control arm 36, which is mounted to the front plate 12 of the housing 10 on pivoting side shafts 38 mounted in bearings. One of these side shafts 38 is continued through the housing 10 to its interior, and is connected to a line control arm lever 40. This line control arm lever 40 in turn is pivotally connected to a swing arm 42, the other end of which is connected to a hinged thumb plate 44, which is mounted to the rear of the housing 10. Although this is called a "thumb plate" 44, the plate 44 may be manipulated by either a thumb or a finger, depending on its positioning, which may alternately be in the form of a trigger. Thus thumb plate 44 is best described as being manipulated by a digit (thumb or finger).

Figure 6:
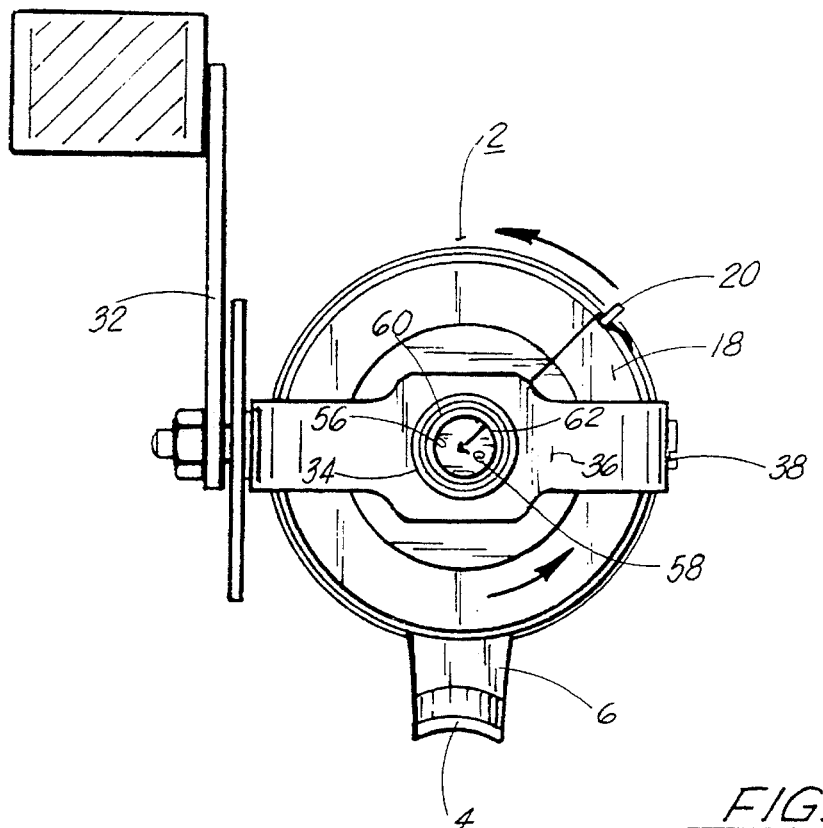
FIG. 6 is a front view of the invention in the line takeup position.
Figure 7:
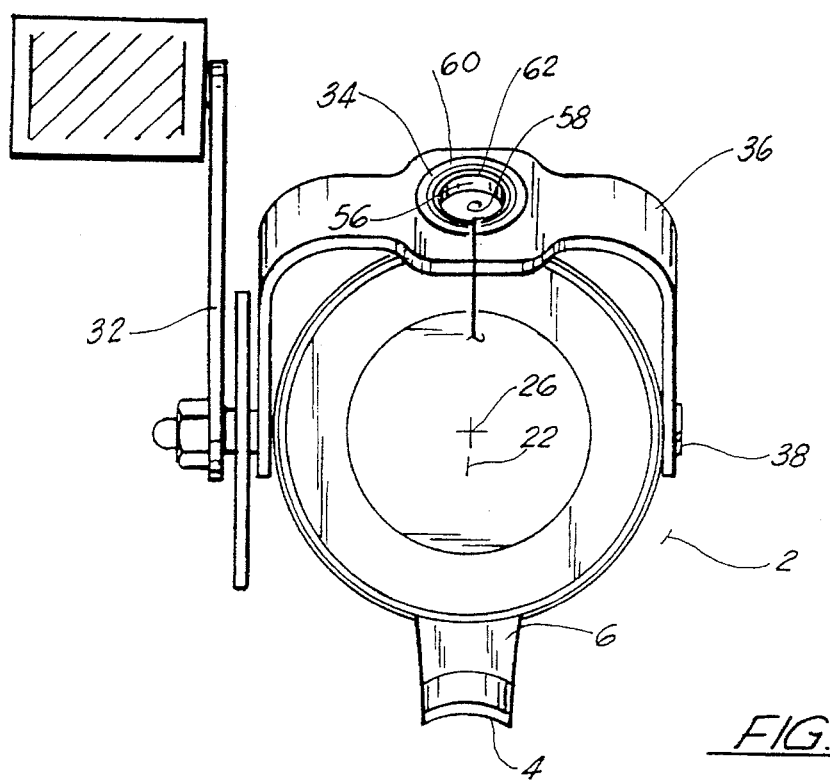
FIG. 7 is a front view of the invention, with the line control arm in transition from the line feathering position to the line snubbing position.

A coiled spring 46 is connected between the line control arm lever 40 and the front plate 12, so as to bias the line control arm 36 into a front centered position as shown in FIGS. 1 and 6. Alternatively, line control arm 36 may be so biased by connecting the spring 46 between control arm lever 40 and swing arm 42.

The direct mechanical linkage of thumb plate 44 and line control arm 36 causes the line control arm 36 to pivot in response to depression of the thumb plate 44. The line control arm 36 can thus be positioned at any angled position between the front centered position and a position at right angles to the axis 50 of the spool 14. As the line control arm 36 so moves, the angled positions from the front center position through about 20 degrees off center is called the feathered position; this position gives slight resistance to free motion of line 16 during casting, just enough for fine line distance control. As line control arm 36 pivots beyond a 20 degree angle, more definite resistance to free line 16 flow off the end of the spool 10 occurs, and such positions are called snubbing positions.

As the thumb plate 44 is depressed, it engages and presses forward the spinner head axle 24 against its spring 47. This action moves the spinner head 18 outwardly from the spool 14 and also causes the line pickup pin 20 to retract into the spinner head 18, freeing the line 16 for casting. This action is timed so that the line control arm 36 reaches the snubing position just as the pickup pin 20 releases the line 16 so that free line drop is minimal. Rotation of the spinner head 18 by the handle cams the pickup pin 20 into an extended position, to engage the line 16 and guide it onto the spool 14 as the line 16 is rewound. The internal construction of the pickup pin 20 is known in the art, and such structures are used on prior art spincast reels.

In spincast reels, prior art construction normally provides an enclosing cover over the spool and spinner head; the line guide is mounted in the front center of the cover. A washer or friction surface is sometimes placed on the front of the spinner head, and the forward motion of the spinner head pinches the line between the spinner head and the cover to snub the line during casting. The force on the line during casting causes it to slide between spinner head and cover as the line is released at the beginning of the cast. Both the snubbing and the friction at release abrade the line, flattening it and weakening it. This damage is especially acute in monofilament lines.

The invention feathers or snubs the line 16 by the combination of the non rotating line spool 14 and pivoting line control arm 36, which moves the line guide 34 from a position in front of the spool 14 axis to a position at right angles to the spool 14. As the thumb plate 44 is depressed, the line guide 34 pivots off the axis of the spool 14. As the line 16 is pulled at increasing angles to the spool 14, there is increasing resistance to free flow of line 16 from the spool 14; at line control arm 36 angles between 20 degrees and 90 degrees to the axis 50, line 16 is effectively snubbed. When the line control arm 36 is centered, the line guide 34 is centered in front of the spool 14, and the line 16 evenly pays out over the spinner head 18, with minimal resistance and maximum casting range. Over the range of line control arm 36 positions between centered and fully up, the line guide 34 is offset progressively from the centered position, and the resulting, increasingly asymmetric line position gradually increases resistance on the line 16 being paid out from the spool 14, as during each cycle of line 16 around the spool 14, the line 16 is pulled at an increasingly greater angle over the spinner head 18. This permits the user to feather the line 16 resistance by raising or lowering the line control arm 36 by single digit pressure. Thus the inventive reel has non-damaging line feathering using one digit (thumb or single finger) control over the line 16.

To cast a bait accurately to a predetermined target with a standard spincast reel, the user generally casts with enough force to land the bait past the target, and then places a finger of the free hand, which is not holding the rod, over the reel's line guide, applying enough force to restrict free flow of the line to gently slow or "feather" the line, causing the bait to land on target. This requires the use of both hands on each cast. Various means have been utilized in the prior art to mechanically feather the line but none have functioned effectively or efficiently. These prior art devices have become discontinued.

The line guide 34 in the invention additionally eliminates or significantly reduces line twist, a common problem with prior art spincast and spinning reels. The center of the line guide 34 is a circular aperture 58, into which is mounted a circular, low friction ball bearing 60. The inner race 62 of this ball bearing 60 forms the inner surface 56 of the line guide 34. upon which the line 16 rides as it is cast, paid out, or retrieved. In contrast to the prior art sleeves, surface inserts, or surface smoothing, the use of a bearing race 62 as the inner surface 56 of the line guide 34 has proven to significantly reduce line twist, and to significantly reduces the cranking power required to retrieve the line 16 under load.

The angle of the line 16 as it passes through the line guide bearing 60 causes the bearing inner race 62 to rotate, eliminating most of the sliding friction which would be encountered in a fixed guide. This bearing action nearly eliminates line twist that is common to spinner and spincast reels.

As an example, a stock Zebco™ model 520 reel and a prototype of the disclosed invention were compared for line twist. Both reels were identically wound with Shakespeare Omniplex™ ten pound test line.

The line end was fastened to the center of a length of dowel rod, which was balanced to hang horizontally; the position of the dowel rod indicated any turning or twisting of the line. Thirty-seven feet of line was pulled out, without turning the dowel, and then the line was reeled back in until the dowel was within thirty inches of the reel. The induced twist was then determined by holding the reel vertical, dowel down, and counting the revolutions as the dowel rotated and the line untwisted. The dowel was stopped after each rotation to prevent false readings from dowel momentum.

The Zebco™ model 520 had twenty-seven twists in the line; the prototype had no twists on the first test, and two twists on a second test.

It can be readily seen that the invention is not restricted to a pivoting line control arm 36 with centrally mounded line guide 34. In a spincast reel of the type having a closed outer cover, the line guide 34 of the invention can be mounted in a semicircular track extending from the front center of the outer cover to the side of the cover. This would provide the advantages of a closed cover over the reel, yet still provide the combination of a continuously variable line guide position between center and side, and the ball bearing inset line guide 34 for line twist elimination. The resulting embodiment would eliminate the line flattening and abrasion of the former closed cover spincast reels, while maintaining the low twist of the invention.

In addition, the cover could be eliminated, and the line guide mounted in a semi circular track extending from the front center of the reel to the side of the reel. The cover is required in a standard spincast reel to control the line flow; the inventive line guide which controls line flow through snubbing by moving the guide off center eliminates the need for the cover. The resulting spincast reel has the advantage of constant visual and physical access to the status of the line, combining the best features of spincast and spinning reels.

It will also be apparent to those skilled in the art that the inventive line guide 34 of the invention can be mounted in a spinning reel, reducing or eliminating line twist in that device.

It is thus apparent that the invention extends beyond the exemplar embodiment shown to embodiments in both open and closed cover spincast reels and to spinning reels. The invention is not limited to the embodiment shown but extends to the wider range of equivalents to the claims.

I claim:

1. In a fishing reel of the type having a non rotating line spool mounted with its axis in line with a fishing rod, a fishing line passing through a line guide from a front end of the line spool, a line winding member rotatably mounted to rotate about said line spool axis to wind said fishing line onto said line spool, the improvement comprising:

a feathering line guide, comprising:
    a thumb plate, depressed responsive to finger pressure;
    means for positioning said line guide, proportional to said finger pressure on said thumb plate, to any point between a position directly in front of said line spool axis to a position to one side of said spool;
    means responsive to said finger pressure on said thumb plate for disengaging said line winding member as said line guide traverses from a position directly in front of said line spool axis to a position to a side of said line spool; and
    means for biasing said line guide to a position in front of said line spool as said thumb plate is released.

2. The fishing reel of claim 1 said means for positioning said line guide comprising:

a line control arm pivotally mounted to said reel, extending to said front end of said line spool.

said line guide being in said line control arm, an arm pivotally connecting said line control arm to said thumb plate whereby said line guide is pivoted from a position in front of said line spool to a position to a side of said line spool, said position corresponding to the depression of said thumb plate, a spring for biasing said line control arm to said line guide position in front of said line spool when said thumb plate is released and, a means for disengaging said line winding member as said thumb plate is depressed.

\* \* \* \* \*